(12) United States Patent
Chiang et al.

(10) Patent No.: US 11,106,211 B2
(45) Date of Patent: Aug. 31, 2021

(54) VISION-BASED SAMPLE-EFFICIENT REINFORCEMENT LEARNING FRAMEWORK FOR AUTONOMOUS DRIVING

(71) Applicant: SONY CORPORATION, Tokyo (JP)

(72) Inventors: Su-Hui Chiang, San Jose, CA (US); Ming-Chang Liu, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 187 days.

(21) Appl. No.: 15/943,223

(22) Filed: Apr. 2, 2018

(65) Prior Publication Data
US 2019/0302785 A1    Oct. 3, 2019

(51) Int. Cl.
*G05D 1/02* (2020.01)
*G06N 20/00* (2019.01)
*G06K 9/00* (2006.01)
*G06N 3/00* (2006.01)
*G06N 5/04* (2006.01)

(52) U.S. Cl.
CPC ......... *G05D 1/0221* (2013.01); *G05D 1/0246* (2013.01); *G05D 1/0248* (2013.01); *G06K 9/00791* (2013.01); *G06K 9/00805* (2013.01); *G06N 3/006* (2013.01); *G06N 20/00* (2019.01); *G05D 2201/0213* (2013.01); *G06N 5/045* (2013.01)

(58) Field of Classification Search
CPC .. G05D 1/0221; G05D 1/0246; G05D 1/0248; G05D 2201/0213; G06N 20/00; G06N 3/006; G06N 5/045; G06K 9/00791; G06K 9/00805

USPC ......................................................... 701/27
See application file for complete search history.

(56) References Cited

U.S. PATENT DOCUMENTS

| | | | |
|---|---|---|---|
| 9,536,191 B1 | 1/2017 | Arel et al. | |
| 9,598,076 B1* | 3/2017 | Jain | B60W 30/09 |
| 2014/0277718 A1* | 9/2014 | Izhikevich | B25J 9/161 |
| | | | 700/250 |
| 2015/0100530 A1 | 4/2015 | Mnih et al. | |
| 2015/0158486 A1 | 6/2015 | Healey et al. | |
| 2017/0024643 A1 | 1/2017 | Lillicrap et al. | |
| 2017/0327138 A1* | 11/2017 | Jordan | B61L 27/0077 |
| 2018/0129974 A1* | 5/2018 | Giering | G06N 3/0454 |
| 2019/0050729 A1* | 2/2019 | Lakshmanan | G08G 1/00 |

FOREIGN PATENT DOCUMENTS

JP    2017181870 A    10/2017

OTHER PUBLICATIONS

Office Action for the Japanese Patent Application No. 2019-025434 dated Feb. 26, 2020.

* cited by examiner

*Primary Examiner* — Yazan A Soofi
*Assistant Examiner* — Naeem Taslim Alam
(74) *Attorney, Agent, or Firm* — Haverstock & Owens LLP

(57) ABSTRACT

A framework combines vision and sample-efficient reinforcement-learning based on guided policy search for autonomous driving. A controller extracts environmental information from vision and is trained to drive using reinforcement learning.

15 Claims, 3 Drawing Sheets

During Training

During Deploying

VISION-BASED SAMPLE-EFFICIENT REINFORCEMENT LEARNING FRAMEWORK FOR AUTONOMOUS DRIVING

FIELD OF THE INVENTION

The present invention relates to autonomous driving. More specifically, the present invention relates to vision-based autonomous driving.

BACKGROUND OF THE INVENTION

Autonomous driving is traditionally based on rules. Some studies approached autonomous driving using reinforcement learning algorithms based on Q-learning or policy gradient. However, rule-based methods cannot scale well, while reinforcement learning methods based on Q-learning or policy gradient are not sample efficient and are very time consuming to solve due to the need to explore a large state space.

SUMMARY OF THE INVENTION

A framework combines vision and sample-efficient reinforcement-learning based on guided policy search for autonomous driving. A controller extracts environmental information from vision and is trained to drive using reinforcement learning.

In one aspect, a method comprises training a reinforcement learning controller for autonomous driving utilizing a vision model and deploying the reinforcement learning controller for autonomous driving utilizing the vision model. Training the reinforcement learning controller for autonomous driving utilizes a first aspect to provide guidance regarding options to explore when making a decision and a second aspect to learn how to react based on vision information from the vision model. The first aspect implements a guided policy search which iteratively optimizes a set of local policies for specific instances of a task and uses the local policies to train a general global policy usable across task instances and limits a search space. In some embodiments, deploying the reinforcement learning controller for autonomous driving utilizes the second aspect to learn how to react based on the vision information from the vision model. The vision model is trained via images and/or videos acquired using one or more vehicle cameras. Training the reinforcement learning controller for autonomous driving utilizes labeled images which include fully or partially observed states. The method further comprises autonomously driving a vehicle using the reinforcement learning controller by sending a signal to at least one of a driving mechanism, a braking mechanism and an acceleration mechanism.

In another aspect, a system comprises a non-transitory memory for storing an application, the application for: training a reinforcement learning controller for autonomous driving utilizing a vision model and utilizing the reinforcement learning controller for autonomous driving utilizing the vision model and a processor coupled to the memory, the processor configured for processing the application. Training the reinforcement learning controller for autonomous driving utilizes a first aspect to provide guidance regarding options to explore when making a decision and a second aspect to learn how to react based on vision information from the vision model. The first aspect implements a guided policy search which iteratively optimizes a set of local policies for specific instances of a task and uses the local policies to train a general global policy usable across task instances and limits a search space. Utilizing the reinforcement learning controller for autonomous driving utilizes the second aspect to learn how to react based on the vision information from the vision model. The vision model is trained via images and/or videos acquired using one or more vehicle cameras. Training the reinforcement learning controller for autonomous driving utilizes labeled images which include fully or partially observed states. The reinforcement learning controller is further configured for autonomously driving a vehicle by sending a signal to at least one of a driving mechanism, a braking mechanism and an acceleration mechanism.

In yet another aspect, a vehicle comprises one or more cameras configured for acquiring vision information and one or more computing devices configured for: training a reinforcement learning controller for autonomous driving utilizing a vision model including the vision information and utilizing the reinforcement learning controller for autonomous driving utilizing the vision model including the vision information. Training the reinforcement learning controller for autonomous driving utilizes a first aspect to provide guidance regarding options to explore when making a decision and a second aspect to learn how to react based on vision information from the vision model. The first aspect implements a guided policy search which iteratively optimizes a set of local policies for specific instances of a task and uses the local policies to train a general global policy usable across task instances and limits a search space. Utilizing the reinforcement learning controller for autonomous driving utilizes the second aspect to learn how to react based on the vision information from the vision model. Training the reinforcement learning controller for autonomous driving utilizes labeled images which include fully or partially observed states. The reinforcement learning controller is further configured for autonomously driving the vehicle by sending a signal to at least one of a driving mechanism, a braking mechanism and an acceleration mechanism.

DETAILED DESCRIPTION OF THE PREFERRED EMBODIMENT

A framework that combines vision (e.g., images) and sample-efficient reinforcement-learning based on a guided policy search for autonomous driving is described herein. The controller extracts environmental information from vision and is trained to drive using reinforcement learning.

The motivation is to be sample efficient to save time and avoid fatigue or damage to robots. The framework combines vision and reinforcement learning based on a guided policy search for autonomous driving. The guided policy search limits the search space within a promising area to be sample efficient.

Vision input such as information acquired using cameras is processed using one or more image/video processing algorithms and then based on the processing algorithms, learning is able to take place. Reinforcement learning is similar to how humans learn by rewarding positive behavior and punishing negative behavior using trial and error. Furthermore, the reinforcement learning learns from the vision input without human engineered features by utilizing deep learning of neural networks. Guided policy search assists in the learning by iteratively optimizing a set of local policies for specific instances of a task and uses the policies to train a general global policy usable across task instances.

Figure 1:
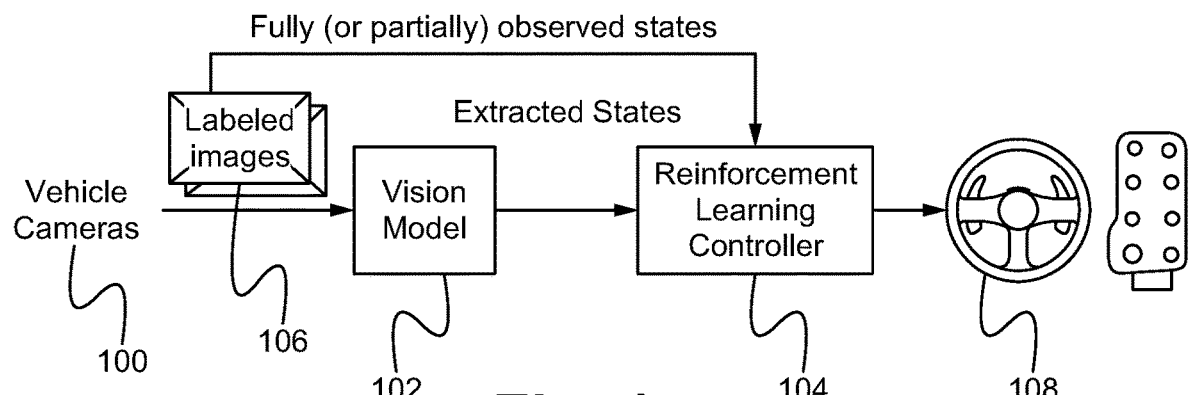
FIG. 1 illustrates a diagram of implementing the vision-based reinforcement learning framework for autonomous driving during training according to some embodiments.

FIG. 1 illustrates a diagram of implementing the vision-based reinforcement learning framework for autonomous driving during training according to some embodiments. Vehicle cameras 100 capture images/videos which are utilized to train and grow a vision model 102. The vision model 102 is used to detect, recognize and classify objects within the images/videos captured such as people, trees, other vehicles and any other object/driving state. In some embodiments, the vision information is captured and stored using LIDAR and/or three-dimensional content acquisition. In some embodiments, audio is captured and used to assist training the vision model. Depending on the implementation, the vision model is able to include images, videos and/or audio, calculation/numerical information, depth map information, classification information, label information, any other information and/or any combination thereof. The output from the vision model 102 goes to a reinforcement learning controller 104 which also receives labeled images 106, which include fully observed states of the images. In some embodiments, the labeled images 106 include partially observed states of the images. The vision model output is able to be in any format and include any type of output such as extracted states for driving. The labeled images 106 are able to include calculation/numerical information, depth map information, classification information, label information, any other information and/or any combination thereof. The reinforcement learning controller 104 utilizes the labeled images 106 and the vision model output to reinforce learning. The reinforcement learning controller 104 utilizes two aspects while training. A first aspect, e.g., a teacher aspect, provides guidance such as a promising search space to explore when making a decision. In some embodiments, the reinforcement learning includes implementing a guided policy search which assists in the learning by iteratively optimizing a set of local policies for specific instances of a task and uses the policies to train a general global policy usable across task instances and limits the search space within a promising area to be sample efficient. For example, instead of utilizing all options of what to do when approaching an object (including hitting the object), guidance is utilized such that options including speeding up and hitting the object are excluded, and more likely options such as braking, slowing down and avoiding the object are focused on. A second aspect, e.g., a learning aspect, learns how to drive/react based on the vision information, options to take (e.g., stopping, accelerating, turning), and outcomes of the options (e.g., hitting the object—negative outcome, avoiding the object—positive outcome). The reinforcement learning controller 104 is used to control the vehicle autonomously 108 by providing signals to the vehicle controller such as triggering braking, acceleration, steering, signaling and/or any other vehicle control feature. The learning is able to occur using a simulation/simulator and/or via actual driving.

Figure 2:
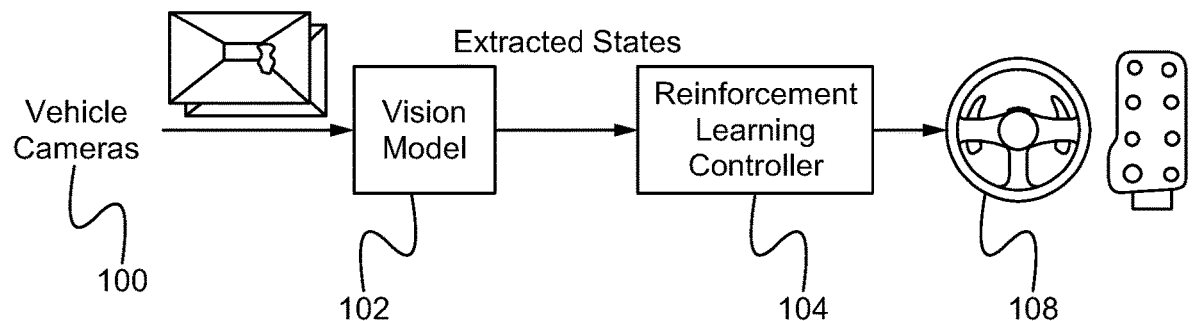
FIG. 2 illustrates a diagram of implementing the vision-based reinforcement learning framework for autonomous driving during deployment according to some embodiments.

FIG. 2 illustrates a diagram of implementing the vision-based reinforcement learning framework for autonomous driving during deployment according to some embodiments. Vehicle cameras 100 capture images/videos which are utilized to train and grow a vision model 102. The vision model 102 is used to detect, recognize and classify objects within the images/videos captured such as people, trees, other vehicles and any other object/driving state. In some embodiments, the vision information is captured and stored using Light Detection and Ranging (LIDAR) and/or three-dimensional content acquisition. In some embodiments, audio is captured and used to assist training the vision model. Depending on the implementation, the vision model is able to include images, videos and/or audio, calculation/numerical information, depth map information, classification information, label information, any other information and/or any combination thereof. The output from the vision model 102 goes to a reinforcement learning controller 104. The vision model output is able to be in any format and include any type of output such as extracted states for driving. The reinforcement learning controller 104 utilizes the previous training and the vision model output. In some embodiments, the reinforcement learning controller 104 continues learning during deployment. The reinforcement learning controller 104 is used to control the vehicle autonomously 108 by providing signals to the vehicle controller such as triggering braking, acceleration, steering, signaling and/or any other vehicle control feature.

In some embodiments, the vision model 102 and the reinforcement learning controller 104 are combined in a single unit.

Figure 3:
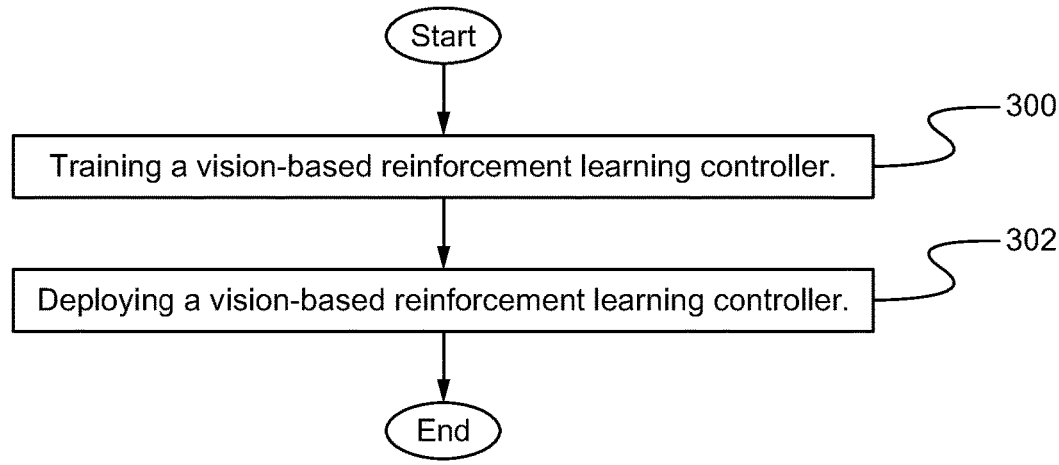
FIG. 3 illustrates a flowchart of a method of implementing the vision-based reinforcement learning framework for autonomous driving according to some embodiments.

FIG. 3 illustrates a flowchart of a method of implementing the vision-based reinforcement learning framework for autonomous training according to some embodiments. In the step 300, a vision-based reinforcement learning controller is trained. In some embodiments, a vision model is trained before or during training of the vision-based reinforcement learning controller. As described above, the reinforcement learning controller is trained using a vision model and labeled images, and both aspects of the reinforcement learning controller (teacher and learning) are utilized for training. In the step 302, the vision-based reinforcement learning controller is deployed. As described above, during deployment, the reinforcement learning controller utilizes the previous training and the vision model output. In some embodiments, the reinforcement learning controller continues learning during deployment. In some embodiments, fewer or additional steps are implemented. In some embodiments, the order of the steps is modified.

Figure 4:
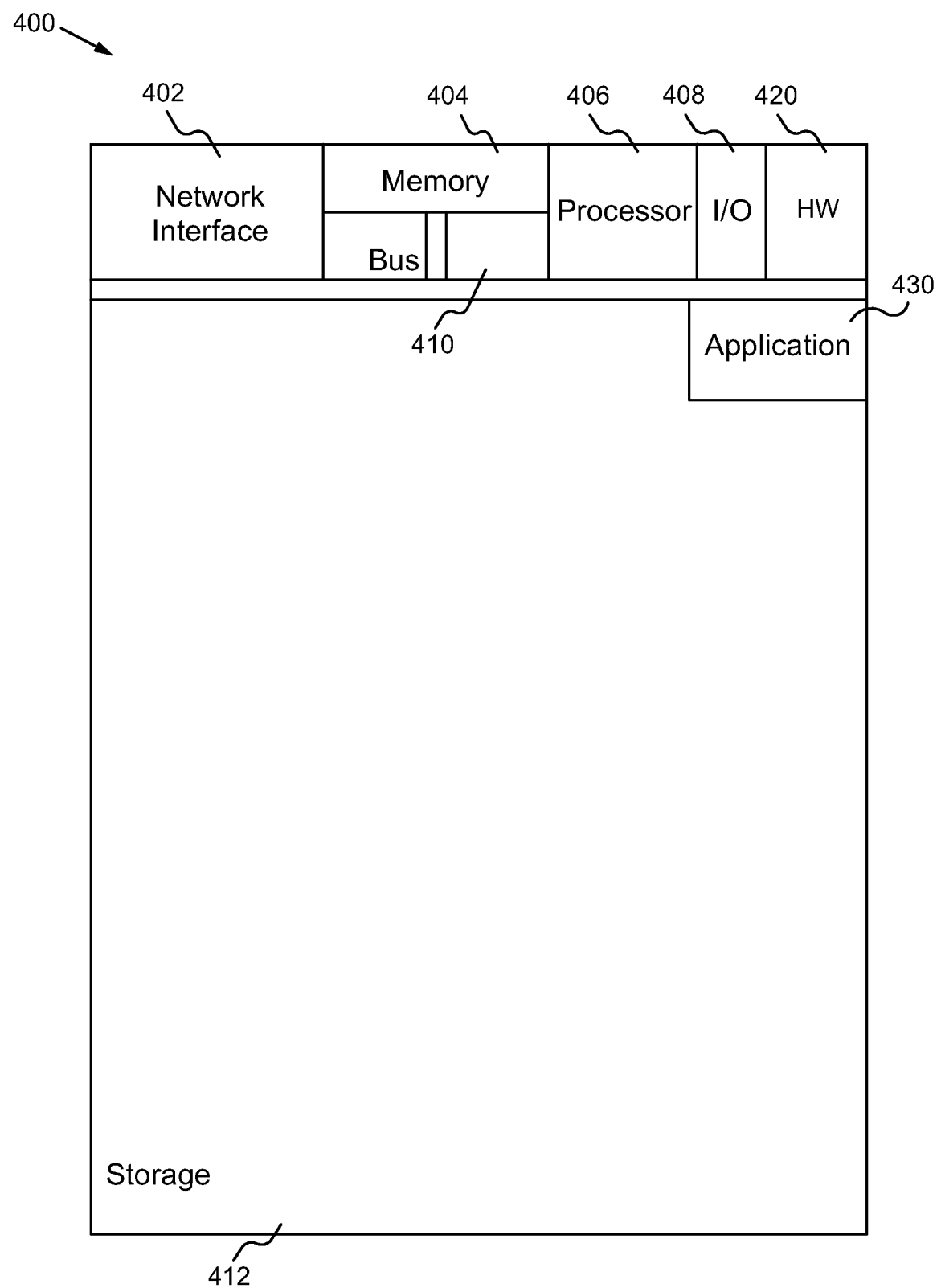
FIG. 4 illustrates a block diagram of an exemplary computing device configured to implement the vision-based reinforcement learning framework according to some embodiments.

FIG. 4 illustrates a block diagram of an exemplary computing device configured to implement the vision-based reinforcement learning framework according to some embodiments. The computing device 400 is able to be used to acquire, store, compute, process, communicate and/or display information such as images and videos. The computing device 400 is able to implement any of the vision-based reinforcement learning framework aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen.

The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Vision-based reinforcement learning framework application(s) 430 used to implement the vision-based reinforcement learning framework are likely to be stored in the storage device 412 and memory 404 and processed as applications are typically processed. More or fewer components shown in FIG. 4 are able to be included in the computing device 400. In some embodiments, vision-based reinforcement learning framework hardware 420 is included. Although the computing device 400 in FIG. 4 includes applications 430 and hardware 420 for the vision-based reinforcement learning framework, the vision-based reinforcement learning framework is able to be implemented on a computing device in hardware, firmware, software or any combination thereof. For example, in some embodiments, the vision-based reinforcement learning framework applications 430 are programmed in a memory and executed using a processor. In another example, in some embodiments, the vision-based reinforcement learning framework hardware 420 is programmed hardware logic including gates specifically designed to implement the vision-based reinforcement learning framework.

In some embodiments, the vision-based reinforcement learning framework application(s) 430 include several applications and/or modules. In some embodiments, modules include one or more sub-modules as well. In some embodiments, fewer or additional modules are able to be included.

Examples of suitable computing devices include a vehicle computer, an embedded computer, a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch) or any other suitable computing device.

Figure 5:
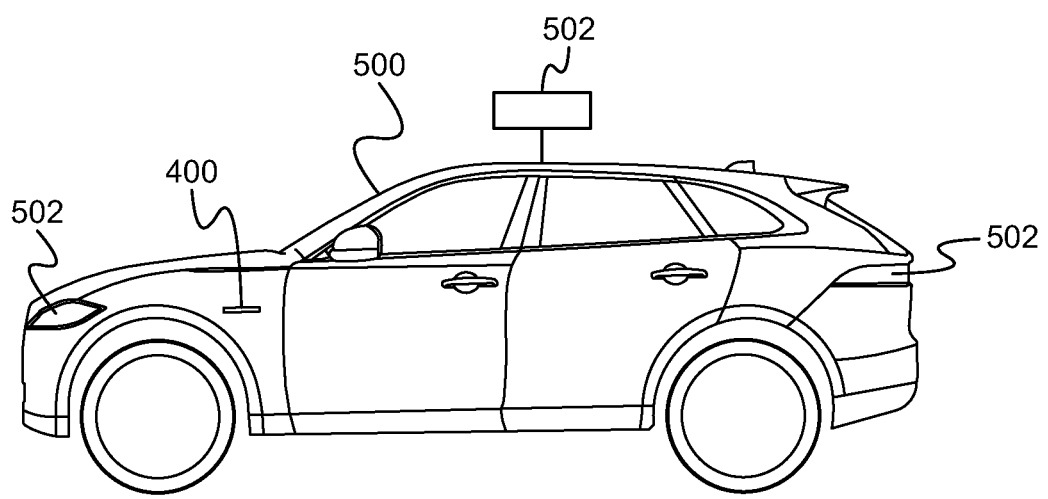
FIG. 5 illustrates a diagram of a vehicle configured for implementing the vision-based reinforcement learning framework according to some embodiments.

FIG. 5 illustrates a diagram of a vehicle configured for implementing the vision-based reinforcement learning framework according to some embodiments. A vehicle 500 includes one or more computing devices 400 which are configured to implement the vision-based reinforcement learning framework utilizing one or more camera devices 502 which are positioned anywhere on the vehicle such as on the top, in the front, on the sides, on the back or underneath. The cameras 502 are able to be any type of camera such as a 360 degree camera, video camera, or rotating camera. Additional devices are able to be utilized to implement the vision-based reinforcement learning framework. Although a car is shown, the vehicle is able to be any type of autonomous or partially autonomous vehicle such as a car, truck, plane, bicycle, motorcycle, or boat.

The framework described herein is able to be used with hardware and software including vision input capable of making decisions fast enough to avoid collisions and/or any other driving situations. The framework is also able to be utilized with games such as racing games.

To utilize the vision-based reinforcement learning framework described herein, a vehicle includes devices such as digital cameras/camcorders which are used to acquire images/videos which are then processed to learn and autonomously drive the vehicle. The vision-based reinforcement learning framework is able to be implemented with user assistance or automatically without user involvement.

In operation, the vision-based reinforcement learning framework combines vision and sample-efficient reinforcement-learning based on guided policy search for autonomous driving. A controller extracts environmental information from vision and is trained to drive using reinforcement learning. By utilizing reinforcement learning instead of rule-based learning, the framework is able to scale much better since automated driving requires millions of decisions for millions of different scenarios. Additionally, the vision-based reinforcement learning framework also utilizes a guided-policy search which directs the search to more promising areas which reduces the search time and focuses the search more appropriately, enabling an efficient learning while making real-time decisions during automated driving.

Some Embodiments of Vision-Based Sample-Efficient Reinforcement Learning Framework for Autonomous Driving 1. A method comprising:
   training a reinforcement learning controller for autonomous driving utilizing a vision model; and
   deploying the reinforcement learning controller for autonomous driving utilizing the vision model.
2. The method of clause 1 wherein training the reinforcement learning controller for autonomous driving utilizes a first aspect to provide guidance regarding options to explore when making a decision and a second aspect to learn how to react based on vision information from the vision model.
3. The method of clause 2 wherein the first aspect implements a guided policy search which iteratively optimizes a set of local policies for specific instances of a task and uses the local policies to train a general global policy usable across task instances and limits a search space.
4. The method of clause 2 wherein deploying the reinforcement learning controller for autonomous driving utilizes the second aspect to learn how to react based on the vision information from the vision model.
5. The method of clause 1 wherein the vision model is trained via images and/or videos acquired using one or more vehicle cameras.
6. The method of clause 1 wherein training the reinforcement learning controller for autonomous driving utilizes labeled images which include fully or partially observed states.
7. The method of clause 1 further comprising autonomously driving a vehicle using the reinforcement learning controller by sending a signal to at least one of a driving mechanism, a braking mechanism and an acceleration mechanism.
8. A system comprising:
   a non-transitory memory for storing an application, the application for:
   training a reinforcement learning controller for autonomous driving utilizing a vision model; and utilizing the reinforcement learning controller for autonomous driving utilizing the vision model; and
a processor coupled to the memory, the processor configured for processing the application.
9. The system of clause 8 wherein training the reinforcement learning controller for autonomous driving utilizes a first aspect to provide guidance regarding options to explore when making a decision and a second aspect to learn how to react based on vision information from the vision model.
10. The system of clause 9 wherein the first aspect implements a guided policy search which iteratively optimizes a set of local policies for specific instances of a task and uses the local policies to train a general global policy usable across task instances and limits a search space.
11. The system of clause 9 wherein utilizing the reinforcement learning controller for autonomous driving utilizes the second aspect to learn how to react based on the vision information from the vision model.
12. The system of clause 8 wherein the vision model is trained via images and/or videos acquired using one or more vehicle cameras.
13. The system of clause 8 wherein training the reinforcement learning controller for autonomous driving utilizes labeled images which include fully or partially observed states.
14. The system of clause 8 wherein the reinforcement learning controller is further configured for autonomously driving a vehicle by sending a signal to at least one of a driving mechanism, a braking mechanism and an acceleration mechanism.
15. A vehicle comprising:
one or more cameras configured for acquiring vision information; and
one or more computing devices configured for:
training a reinforcement learning controller for autonomous driving utilizing a vision model including the vision information; and
utilizing the reinforcement learning controller for autonomous driving utilizing the vision model including the vision information.
16. The vehicle of clause 15 wherein training the reinforcement learning controller for autonomous driving utilizes a first aspect to provide guidance regarding options to explore when making a decision and a second aspect to learn how to react based on vision information from the vision model.
17. The vehicle of clause 16 wherein the first aspect implements a guided policy search which iteratively optimizes a set of local policies for specific instances of a task and uses the local policies to train a general global policy usable across task instances and limits a search space.
18. The vehicle of clause 16 wherein utilizing the reinforcement learning controller for autonomous driving utilizes the second aspect to learn how to react based on the vision information from the vision model.
19. The vehicle of clause 15 wherein training the reinforcement learning controller for autonomous driving utilizes labeled images which include fully or partially observed states.
20. The vehicle of clause 15 wherein the reinforcement learning controller is further configured for autonomously driving the vehicle by sending a signal to at least one of a driving mechanism, a braking mechanism and an acceleration mechanism.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
training a reinforcement learning controller for autonomous driving utilizing a vision model, wherein training the reinforcement learning controller for autonomous driving utilizes a first aspect to provide guidance regarding options to explore when making a decision and a second aspect to learn how to react based on vision information from the vision model, wherein the first aspect implements a guided policy search which iteratively optimizes a set of local policies for specific instances of a task and uses the local policies to train a general global policy usable across task instances and limits a search space; and
deploying the reinforcement learning controller for autonomous driving utilizing the vision model, wherein the vision model includes images, videos, audio, calculations, depth information, classification information and label information, wherein the vision model is trained via the audio acquired using one or more vehicle cameras, wherein the guided policy search which iteratively optimizes the set of local policies for specific instances of the task and uses the local policies to train the general global policy usable across task instances and limits the search space further includes removing less likely options from a full set of options, including excluding speeding up and/or hitting an object, to generate a limited set of options which focuses on more likely options, and wherein the reinforcement learning controller learns, based on the vision model, one or more options to take and one or more outcomes of the options to take, including negative options and positive options.
2. The method of claim 1 wherein deploying the reinforcement learning controller for autonomous driving utilizes the second aspect to learn how to react based on the vision information from the vision model.
3. The method of claim 1 wherein the vision model is trained via images and/or videos acquired using one or more vehicle cameras.
4. The method of claim 1 wherein training the reinforcement learning controller for autonomous driving utilizes labeled images which include fully or partially observed states.
5. The method of claim 1 further comprising autonomously driving a vehicle using the reinforcement learning controller by sending a signal to at least one of a driving mechanism, a braking mechanism and an acceleration mechanism.
6. A system comprising:
a non-transitory memory for storing an application, the application for:
training a reinforcement learning controller for autonomous driving utilizing a vision mode, wherein training the reinforcement learning controller for autonomous driving utilizes a first aspect to provide guidance regarding options to explore when making a decision and a second aspect to learn how to react based on vision information from the vision model, wherein the first aspect implements a guided policy search which iteratively optimizes a set of local policies for specific instances of a task and uses the local policies to train a general global policy usable across task instances and limits a search space; and utilizing the reinforcement learning controller for autonomous driving utilizing the vision model, wherein the vision model includes images, videos, audio, calculations, depth information, classification information and label information, wherein the vision model is trained via the audio acquired using one or more vehicle cameras, wherein the guided policy search which iteratively optimizes the set of local policies for specific instances of the task and uses the local policies to train the general global policy usable across task instances and limits the search space further includes removing less likely options from a full set of options, including excluding speeding up and/or hitting an object, to generate a limited set of options which focuses on more likely options and wherein the reinforcement learning controller learns, based on the vision model, one or more options to take and one or more outcomes of the options to take, including negative options and positive options; and a processor coupled to the memory, the processor configured for processing the application.

7. The system of claim 6 wherein utilizing the reinforcement learning controller for autonomous driving utilizes the second aspect to learn how to react based on the vision information from the vision model.

8. The system of claim 6 wherein the vision model is trained via images and/or videos acquired using one or more vehicle cameras.

9. The system of claim 6 wherein training the reinforcement learning controller for autonomous driving utilizes labeled images which include fully or partially observed states.

10. The system of claim 6 wherein the reinforcement learning controller is further configured for autonomously driving a vehicle by sending a signal to at least one of a driving mechanism, a braking mechanism and an acceleration mechanism.

11. A vehicle comprising: one or more cameras configured for acquiring vision information; and one or more computing devices configured for:

training a reinforcement learning controller for autonomous driving utilizing a vision model including the vision information, wherein training the reinforcement learning controller for autonomous driving utilizes a first aspect to provide guidance regarding options to explore when making a decision and a second aspect to learn how to react based on vision information from the vision model, wherein the first aspect implements a guided policy search which iteratively optimizes a set of local policies for specific instances of a task and uses the local policies to train a general global policy usable across task instances and limits a search space; and utilizing the reinforcement learning controller for autonomous driving utilizing the vision model including the vision information, wherein the vision model includes images, videos, audio, calculations, depth information, classification information and label information, wherein the vision model is trained via the audio acquired using the one or more cameras, wherein the guided policy search which iteratively optimizes the set of local policies for specific instances of the task and uses the local policies to train the general global policy usable across task instances and limits the search space further includes removing less likely options from a full set of options to generate a limited set of options which focuses on more likely options, and wherein the reinforcement learning controller learns, based on the vision model, one or more options to take and one or more outcomes of the options to take, including negative options and positive options, and wherein removing less likely options from the full set of options to generate the limited set of options which focuses on more likely options includes removing the negative options including excluding speeding up and/or hitting an object.

12. The vehicle of claim 11 wherein utilizing the reinforcement learning controller for autonomous driving utilizes the second aspect to learn how to react based on the vision information from the vision model.

13. The vehicle of claim 11 wherein training the reinforcement learning controller for autonomous driving utilizes labeled images which include fully or partially observed states.

14. The vehicle of claim 11 wherein the reinforcement learning controller is further configured for autonomously driving the vehicle by sending a signal to at least one of a driving mechanism, a braking mechanism and an acceleration mechanism.

15. The vehicle of claim 11 wherein the full set of options include driving options selected from the group consisting of braking, slowing down, avoiding an object, accelerating, and turning.

* * * * *